United States Patent
Murakami (10) Patent No.: US 8,340,583 B2
(45) Date of Patent: *Dec. 25, 2012

(54) RECEIVER CIRCUIT, ELECTRONIC INSTRUMENT, AND SIGNAL PROCESSING METHOD

(75) Inventor: Makoto Murakami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,001

(22) Filed: Jun. 6, 2011

(65) Prior Publication Data

US 2011/0237215 A1    Sep. 29, 2011

Related U.S. Application Data

(63) Continuation of application No. 11/953,614, filed on Dec. 10, 2007, now Pat. No. 7,979,029.

(30) Foreign Application Priority Data

Dec. 13, 2006    (JP) ................................. 2006-335454

(51) Int. Cl.
*H04B 1/00* (2006.01)
*H04K 3/00* (2006.01)

(52) U.S. Cl. .................... 455/63.1; 455/67.13; 455/296; 342/357.59

(58) Field of Classification Search ................ 455/63.1, 455/67.13, 295, 296, 552.1; 342/357.1, 357.59
See application file for complete search history.

(56) References Cited

U.S. PATENT DOCUMENTS

| | | | | |
|---|---|---|---|---|
| 4,989,262 | A * | 1/1991 | Saito | 455/138 |
| 6,510,308 | B1 | 1/2003 | Thomas et al. | |
| 6,791,491 | B2 | 9/2004 | Talvitie | |
| 7,373,129 | B2 * | 5/2008 | Fukuda et al. | 455/296 |
| 2004/0048576 | A1 | 3/2004 | Hildebrand et al. | |
| 2004/0203458 | A1 | 10/2004 | Nigra | |
| 2006/0055594 | A1 | 3/2006 | McConnell et al. | |

FOREIGN PATENT DOCUMENTS

| | | |
|---|---|---|
| JP | 11-027160 A | 1/1999 |
| JP | 11-094888 A | 4/1999 |
| JP | 2006-145315 A | 6/2006 |
| WO | WO-2005/050896 A2 | 6/2005 |

* cited by examiner

*Primary Examiner* — Lee Nguyen
(74) *Attorney, Agent, or Firm* — Global IP Counselors, LLP (57) ABSTRACT

In a portable phone, a signal received by a GPS antenna passes through a SAW filter and is amplified by an LNA. An addition section adds a cancellation signal generated by a cancellation signal generation section to the amplified signal to cancel noise superimposed on the received signal.

6 Claims, 8 Drawing Sheets

RECEIVER CIRCUIT, ELECTRONIC INSTRUMENT, AND SIGNAL PROCESSING METHOD

CROSS-REFERENCE TO THE RELATED APPLICATIONS

This application is a continuation application which claims priority to U.S. patent application Ser. No. 11/953,614 filed on Dec. 10, 2007 and Japanese Patent Application No. 2006-335454 filed on Dec. 13, 2006, is hereby incorporated by reference in its entirety.

BACKGROUND OF THE INVENTION

The present invention relates to a receiver circuit, an electronic instrument, and a signal processing method.

In an electronic instrument including a receiver circuit, an alternating current signal may be generated due to a change in electromagnetic field accompanying the circuit operation of an electronic circuit disposed near the receiver circuit. The alternating current signal may be transmitted to the receiver circuit and mixed into the received signal as an interference wave. Such a phenomenon causes a significant signal deterioration. Therefore, various technologies have been proposed to remove an interference wave superimposed on a received signal.

For example, JP-A-2006-145315 discloses technology which reverses the phase of a signal generated by an electronic circuit using a delay line to generate a signal (hereinafter referred to as "cancellation signal") which cancels the generated signal, thereby removing an interference wave.

A signal received by a reception section such as an antenna is a weak signal. Therefore, it is a common practice to increase the signal level of the received signal by amplification and process the amplified signal. According to the technology disclosed in JP-A-2006-145315, a contact point of the delay line is provided at a position in the middle of a signal line which connects the antenna and the signal processing system in the preceding stage of the amplification stage, and the cancellation signal is added to a weak signal immediately after reception.

Therefore, it is necessary to appropriately cancel the interference wave component mixed into the weak received signal by accurately controlling the signal level of the cancellation signal added to the received signal. If the signal level of the cancellation signal is inappropriate, the interference wave component may increase due to the cancellation signal having a signal level exceeding a signal level sufficient to cancel the interference wave component, whereby the reception sensitivity may deteriorate.

SUMMARY

According to one aspect of the invention, there is provided a receiver circuit comprising:

a cancellation signal generation section that generates a cancellation signal, the cancellation signal canceling a signal generated by an electronic circuit disposed near a reception section that receives a radio signal; and an addition section that adds the cancellation signal generated by the cancellation signal generation section to a signal in a signal processing system that processes a received signal received by the reception section at a specific position in the signal processing system.

DETAILED DESCRIPTION OF THE EMBODIMENT

According to one embodiment of the invention, there is provided a receiver circuit comprising:

a cancellation signal generation section that generates a cancellation signal, the cancellation signal canceling a signal generated by an electronic circuit disposed near a reception section that receives a radio signal; and an addition section that adds the cancellation signal generated by the cancellation signal generation section to a signal in a signal processing system that processes a received signal received by the reception section at a specific position in the signal processing system.

According to the above configuration, the cancellation signal generated by the cancellation signal generation section is added to the signal in the signal processing system which processes the received signal received by the reception section at a specific position in the middle of the signal processing system, whereby noise superimposed on the received signal is canceled. Therefore, since the cancellation signal is added in a state in which the signal in the signal processing system has a high signal level, the signal level of the cancellation signal can be easily adjusted as compared with the case of adding the cancellation signal to the received signal received by the reception section immediately after an antenna.

According to another embodiment of the invention, there is provided a signal processing method comprising:

generating a cancellation signal that cancels a signal generated by an electronic circuit disposed near a reception section that receives a radio signal; and adding the cancellation signal to a signal in a signal processing system that processes a received signal received by the reception section at a specific position in the signal processing system.

In the receiver circuit according to this embodiment, the receiver circuit may further include:

a local oscillation signal generation section;

an intermediate frequency conversion section that multiplies the received signal received by the reception section by a local oscillation signal generated by the local oscillation signal generation section to convert the received signal to an intermediate-frequency signal, the intermediate frequency conversion section outputting the intermediate-frequency signal to a subsequent stage in the signal processing system; and a filter section that allows a component of the signal output from the intermediate frequency conversion section to pass through, the component being in a band corresponding to an intermediate frequency of the radio signal, the cancellation signal generation section may include a phase shifter section that shifts a phase of the local oscillation signal generated by the local oscillation signal generation section by 180 degrees, and the cancellation signal generation section may generate the cancellation signal by multiplying the signal generated by the electronic circuit by the signal that has been phase-shifted by the phase shifter section; and the addition section may add the cancellation signal generated by the cancellation signal generation section to the intermediate-frequency signal output from the intermediate frequency conversion section in a preceding stage of the filter section.

According to the above configuration, the intermediate frequency conversion section multiplies the signal received by the reception section by the local oscillation signal, whereby the signal received by the reception section is converted into an intermediate-frequency signal. On the other hand, the cancellation signal generation section multiplies the signal generated by the electronic circuit disposed near the reception section by the local oscillation signal of which the phase has been shifted by the phase shifter section by 180 degrees to generate the cancellation signal. The intermediate-frequency signal converted by the intermediate frequency conversion section is added to the cancellation signal generated by the cancellation signal generation section, and the resulting signal is output to the filter section which allows a band corresponding to the intermediate frequency of the radio signal to pass through.

The signal generated by the electronic circuit disposed near the reception section contains signals at various frequencies, and does not have a constant signal level. On the other hand, since the local oscillation signal has a constant frequency and a constant signal level, it is easy to shift the phase of the local oscillation signal. Therefore, the phase of the signal generated by the electronic circuit can be simply shifted by employing a configuration in which the signal generated by the electronic circuit is multiplied by the local oscillation signal of which the phase has been shifted.

The noise in a band other than the band corresponding to the intermediate frequency of the radio signal may not be completely canceled from the signal obtained as a result of the addition by the addition section. However, such noise is removed by the filter section.

In the signal processing method according to this embodiment, the method may further include:

generating a local oscillation signal;

multiplying the received signal by the local oscillation signal to convert the received signal to an intermediate-frequency signal;

extracting a signal in a band corresponding to an intermediate frequency of the radio signal from the intermediate-frequency signal, and outputting the extracted signal to a circuit in a subsequent stage; and shifting a phase of the local oscillation signal by 180 degrees, the generating of the cancellation signal including generating the cancellation signal by multiplying the signal generated by the electronic circuit by the local oscillation signal that has been phase-shifted; and the adding of the cancellation signal including adding the cancellation signal to the intermediate-frequency signal.

In the receiver circuit according to this embodiment, the cancellation signal generation section may include an attenuation section that attenuates a signal obtained by multiplying the signal generated by the electronic circuit by the signal that has been phase-shifted by the phase shifter section by a specific attenuation factor.

According to the above configuration, the signal obtained by multiplying the signal generated by the electronic circuit by the local oscillation signal that has been phase-shifted by the phase shifter section is attenuated by a specific attenuation factor.

In the signal processing method according to this embodiment, the generating of the cancellation signal may include attenuating a signal obtained by multiplying the signal generated by the electronic circuit by the local oscillation signal that has been phase-shifted by a specific attenuation factor.

In the receiver circuit according to this embodiment, the attenuation factor may be set in advance at such a value that an amount of noise component in a band corresponding to the intermediate frequency of the radio signal is minimized from the signal obtained as a result of the addition by the addition section.

According to the above configuration, a signal for which the attenuation factor is adjusted so that the amount of noise component in a band corresponding to the intermediate frequency of the radio signal is minimized is output from the addition section.

In the signal processing method according to this embodiment, the attenuation factor may be set in advance at such a value that an amount of noise component in a band corresponding to the intermediate frequency of the radio signal is minimized from the signal obtained as a result of the addition.

In the receiver circuit according to this embodiment, the receiver circuit may further include:

an attenuation factor control section that generates and outputs a control signal based on a signal level of the signal output from the filter section, the control signal controlling the attenuation factor of the attenuation section, and the attenuation section may attenuate the signal that has been phase-shifted by the phase shifter section by the attenuation factor corresponding to the control signal output from the attenuation factor control section.

According to the above configuration, the attenuation factor of the attenuation section is changed based on the signal level of the signal output from the filter section. Therefore, noise superimposed on the received signal can be appropriately cancelled by changing the attenuation factor so that the signal level of the signal output from the filter section decreases, for example.

In the signal processing method according to this embodiment, the method may further include:

generating a control signal that controls the attenuation factor based on a signal level of the extracted signal, the attenuating may include attenuating the local oscillation signal that has been phase-shifted by the attenuation factor corresponding to the control signal.

In the receiver circuit according to this embodiment, the receiver circuit may include:

a plurality of the cancellation signal generation sections that respectively correspond to a plurality of electronic circuits disposed near the reception section that receives the radio signal, each of the plurality of cancellation signal generation sections generating the cancellation signal that cancels a signal generated by a corresponding electronic circuit among the plurality of electronic circuits, and the addition section may add the cancellation signal generated by each of the plurality of cancellation signal generation sections to the signal in the signal processing system.

According to the above configuration, the cancellation signal which cancels the signal generated by the corresponding electronic circuit is generated in units of electronic circuits disposed near the reception section, and each generated cancellation signal is added to the received signal. Therefore, even if two or more noise sources exist, noise superimposed on the received signal can be appropriately cancelled.

In the signal processing method according to this embodiment, the method may further include:

generating a plurality of the cancellation signals that respectively correspond to a plurality of electronic circuits disposed near the reception section that receives the radio signal, each of the plurality of cancellation signals canceling a signal generated by a corresponding electronic circuit among the plurality of electronic circuits, and the adding of the cancellation signal may include adding each of the plurality of cancellation signals that have been generated to the signal in the signal processing system.

According to a further embodiment of the invention, there is provided an electronic instrument including the above receiver circuit, the receiver circuit receiving a satellite signal from a positioning satellite.

According to the above configuration, noise superimposed on the satellite signal from the positioning satellite is canceled in combination with the above configuration of the receiver circuit.

In the electronic instrument according to this embodiment, the electronic instrument may include a wireless communication circuit as the electronic circuit, the wireless communication circuit being disposed at a specific position in the electronic instrument.

According to the above configuration, noise from the wireless communication circuit section superimposed on the satellite signal from the positioning satellite is canceled in combination with the above configuration.

In the electronic instrument according to this embodiment, the electronic instrument may be a portable phone, the receiver circuit may be a circuit that receives a GPS satellite signal, and the wireless communication circuit may be a portable phone communication circuit.

According to the above configuration, noise from the portable phone communication circuit superimposed on the received GPS satellite signal is canceled in the portable phone in combination with the above configuration.

Embodiments of the invention are described below with reference to the drawings. Note that the embodiments described below do not in any way limit the scope of the invention laid out in the claims. Note that all elements of the embodiments described below should not necessarily be taken as essential requirements for the invention.

Embodiments when applying the invention to a portable phone (electronic instrument) having a navigation function are described below with reference to the drawings.

1. First Embodiment 1-1 Configuration

Figure 1:
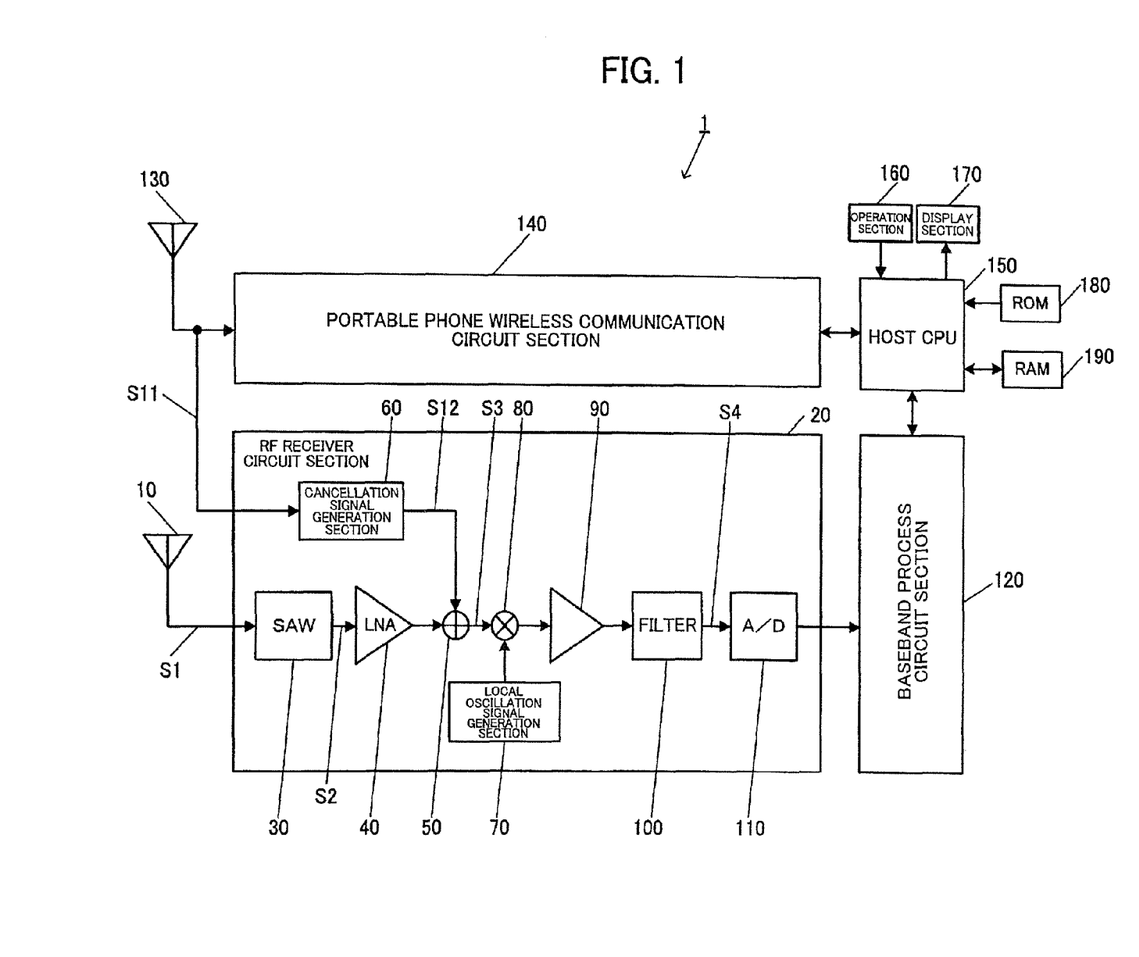
FIG. 1 is a block diagram showing the configuration of a portable phone according to a first embodiment.

FIG. 1 is a block diagram showing the functional configuration of a portable phone 1 according to a first embodiment. The portable phone 1 is configured to include a GPS antenna 10, a radio frequency (RF) receiver circuit section 20, a baseband process circuit section 120, a portable phone antenna 130, a portable phone wireless communication circuit section 140, a host central processing unit (CPU) 150, an operation section 160, a display section 170, a read only memory (ROM) 180, and a random access memory (RAM) 190.

The RF receiver circuit section 20 and the baseband process circuit section 120 of the portable phone 1 may be produced as different large scale integrated (LSI) circuits, or may be produced in one chip.

The GPS antenna 10 is an antenna which receives an RF signal including a GPS satellite signal (radio signal) transmitted from a GPS satellite. The GPS antenna 10 outputs a received signal S1 to the RF receiver circuit section 20.

The RF receiver circuit section 20 is an RF signal receiver circuit configured to include a surface acoustic wave (SAW) filter 30, a low noise amplifier (LNA) 40, an addition section 50, a cancellation signal generation section 60, a local oscillation signal generation section 70, a multiplication section 80, an amplification section 90, a filter 100, and an analog/digital (A/D) conversion section 110. A GPS satellite signal reception section including the GPS antenna 10 and the RF receiver circuit section 20 is hereinafter referred to as a GPS reception section.

The SAW filter 30 is a bandpass filter which allows a specific frequency band component of the signal S1 output from the GPS antenna 10 to pass through, and outputs a signal S2 which has passed through the SAW filter 30 to the LNA 40.

The LNA 40 is a low noise amplifier which amplifies the signal S2 which has passed through the SAW filter 30, and outputs the amplified signal to the addition section 50.

The addition section 50 includes an adder which adds a cancellation signal S12 generated by the cancellation signal generation section 60 to the signal amplified by the LNA 40. The addition section 50 outputs an addition result signal S3 to the multiplication section 80.

The cancellation signal generation section 60 is a circuit section to which a signal S11 generated by a portable phone electronic circuit (hereinafter referred to as "portable phone electronic circuit") including the portable phone antenna 130 and the phone wireless communication circuit section 140 is input and which shifts the phase of the input signal by 180 degrees and then attenuates the amplitude of the resulting signal to generate the cancellation signal S12.

The portable phone electronic circuit and the GPS antenna 10 or the RF receiver circuit section 20 are disposed in the portable phone 1 at nearby positions. As a result, an alternating current signal generated due to a change in electromagnetic field caused by the circuit operation of the portable phone electronic circuit is superimposed on the received signal received by the GPS antenna 10 as an interference wave. In particular, since the portable phone electronic circuit transmits and receives a radio wave in a frequency band of 1.7 GHz or 2.0 GHz near the frequency of the GPS satellite signal (1.5 GHz band), the portable phone frequency signal is superimposed as an interference wave.

Figure 2:
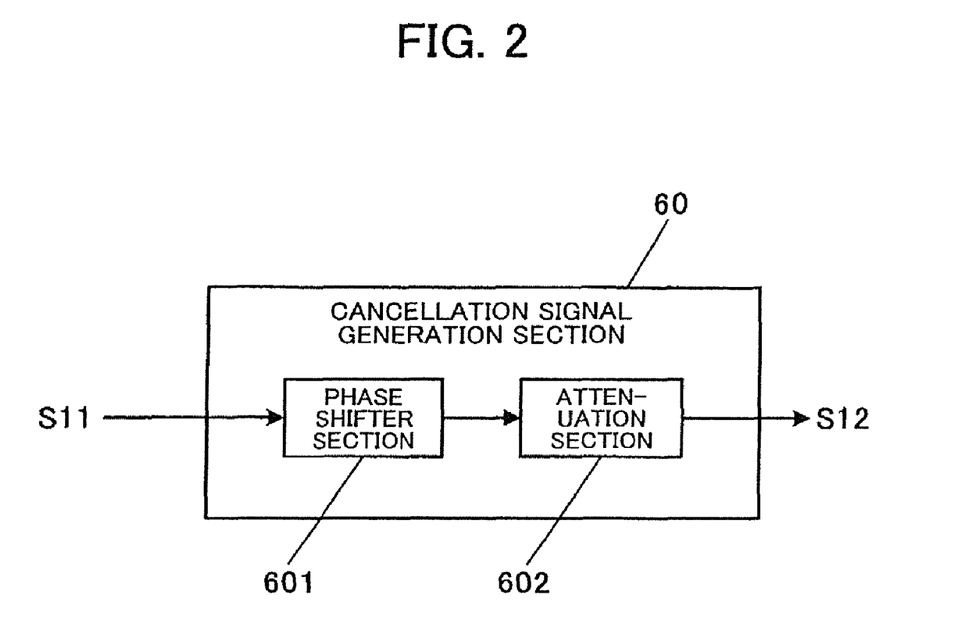
FIG. 2 is a view showing the circuit configuration of a cancellation signal generation section according to the first embodiment.

FIG. 2 is a view showing an example of the circuit configuration of the cancellation signal generation section 60. The cancellation signal generation section 60 is configured to include a phase shifter section 601 and an attenuation section 602.

The phase shifter section 601 is a phase shifter circuit including a delay element and the like. The phase shifter section 601 shifts the phase of the generated signal S11 by 180 degrees, and outputs the resulting signal to the attenuation section 602. The phase shift target frequency is the same as the frequency of the GPS satellite signal.

The attenuation section 602 is an attenuator which attenuates the signal output from the phase shifter section 601 by a specific attenuation factor (gain). The attenuation section 602 outputs the attenuated signal to the addition section 50 as the cancellation signal S12.

The attenuation factor of the attenuation section 602 is set in the production stage of the portable phone 1 after the positional relationship between the GPS reception section and the portable phone electronic circuit has been determined. Specifically, the attenuation factor is adjusted so that the amount of noise component in a band corresponding to the intermediate frequency of the GPS satellite signal is minimized in the signal obtained as a result of the addition by the addition section 50, and the adjustment result value is set as a design value.

The local oscillation signal generation section 70 is a circuit section which includes an oscillator such as a local oscillator (LO) and generates an RF signal multiplication local oscillation signal. The local oscillation signal generation section 70 outputs the generated local oscillation signal to the multiplication section 80.

The multiplication section 80 down-converts the RF signal to an intermediate-frequency signal (hereinafter referred to as "IF signal") by multiplying the addition result signal S3 output from the addition section 50 by the local oscillation signal generated by the local oscillation signal generation section 70, and outputs the resulting signal to the amplification section 90.

The amplification section 90 is an amplifier which amplifies the IF signal output from the multiplication section 80 by a specific amplification factor. The amplification section 90 outputs the amplified signal to the filter 100.

The filter 100 is a bandpass filter which allows a component of the signal amplified by the amplification section 90 in a specific frequency band including the frequency band of the signal component of the IF signal to pass through, and outputs a signal S4 which has passed through the filter 100 to the A/D conversion section 110.

The A/D conversion section 110 is an A/D converter which converts an analog signal into a digital signal. The A/D conversion section 110 converts the signal which has passed through the filter 100 into a digital signal, and outputs the resulting digital signal to the baseband process circuit section 120.

The baseband process circuit section 120 is a circuit section which acquires/extracts the GPS satellite signal by performing a correlation detection process and the like for the IF signal output from the RF conversion circuit section 20, decodes the data to acquire a navigation message, time information, and the like, and performs pseudo-range calculations, positioning calculations, and the like. The GPS satellite signal is a spread spectrum modulated signal called a coarse and acquisition (C/A) code.

The portable phone antenna 130 is an antenna which transmits and receives a portable phone radio signal between the portable phone 1 and a radio base station installed by a portable phone communication service provider.

The portable phone wireless communication circuit section 140 is a portable phone communication circuit section including an RF conversion circuit, a baseband process circuit, and the like. The portable phone wireless communication circuit section 140 implements a telephone call, e-mail transmission/reception, and the like by modulating/demodulating the portable phone radio signal, for example.

The host CPU 150 is a processor which controls each section of the portable phone 1 based on various programs such as a system program stored in the ROM 180. The host CPU 150 mainly controls the telephone function, and causes the display section 170 to display a navigation screen in which the present position of the portable phone 1 located by the baseband process circuit section 120 is plotted.

The operation section 160 is an input device including an operation key, a button switch, and the like, and outputs a press signal to the host CPU 150. Various instruction inputs such as a telephone call request and a navigation screen display request are performed by operating the operation section 160.

The display section 170 is a display device which includes a liquid crystal display (LCD) or the like, and displays various images based on a display signal input from the host CPU 150. The display section 170 displays date and time information, a navigation screen, and the like.

The ROM 180 is a read-only storage device. The ROM 180 stores data and various programs such as a system program for controlling the portable phone 1, a program for implementing a telephone call and e-mail transmission/reception, and a program for implementing a navigation function. The host CPU 150 performs a process based on these programs and data. The RAM 190 is a readable/writable storage device. The RAM 190 serves as a work area which temporarily stores the system program executed by the host CPU 150, various processing programs, data processed during various processes, processing results, and the like.

1-2. Principle and Operation

Figure 3:
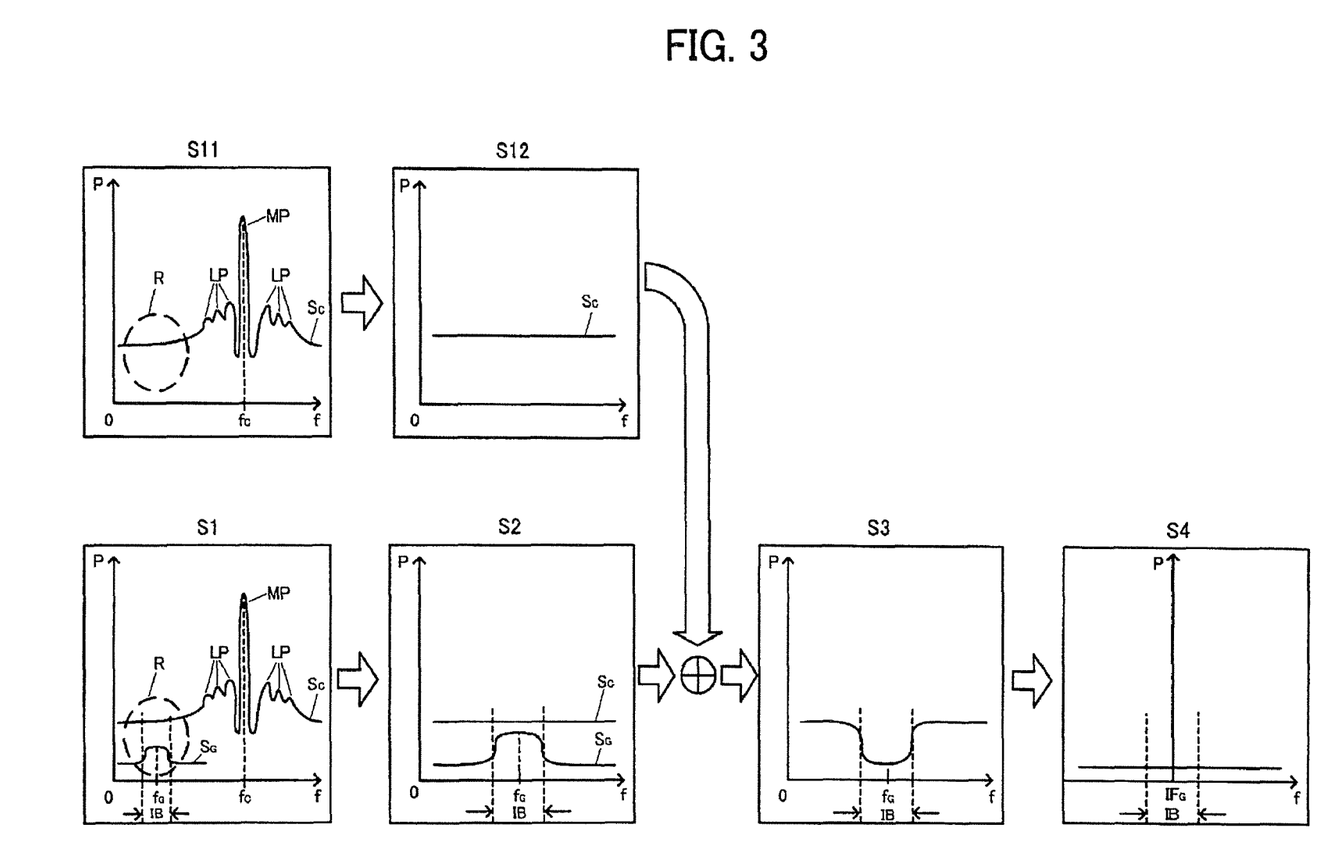
FIG. 3 is a view illustrative of an interference wave removal principle according to the first embodiment.

FIG. 3 is a view illustrative of an interference wave removal principle. In FIG. 3, the horizontal axis indicates frequency (f), and the vertical axis indicates signal level (P). FIG. 3 schematically shows the frequency spectra of the signals S1, S2, S3, S4, S11, and S12 shown in FIG. 1. Regarding the signals S2, S3, S4, and S12, FIG. 3 gives an enlarged diagram showing the frequency spectrum in a region R around an in-band IB of the GPS satellite signal in order to concisely illustrate the features of this embodiment.

The signal S1 output from the GPS antenna 10 to the RF receiver circuit section 20 is a GPS satellite signal on which various types of noise are superimposed. Most of the noise is the portable phone radio signal transmitted to the GPS reception section from the portable phone electronic circuit disposed near the RF receiver circuit section 20. In the diagrams showing the signals S1 and S2, the frequency spectrum of the GPS satellite signal is indicated by $S_G$, and the frequency spectrum of the portable phone radio signal is indicated by $S_C$.

The GPS satellite signal is a 1.5 GHz-band signal in which a carrier at a frequency of 1.57542 GHz (hereinafter referred to as "GPS frequency") is spread. The GPS satellite signal is a weak signal. In the frequency spectrum $S_G$ of the GPS satellite signal, a specific band around a GPS frequency $f_G$ is referred to the in-band IB.

The frequency of the portable phone radio signal is 1.7 GHz, 2.0 GHz, or the like depending on the communication method. The portable phone radio signal is a strong signal as compared with the GPS satellite signal. The frequency spectrum $S_C$ of the portable phone radio signal has a maximum peak MP at a portable phone frequency $F_C (>f_G)$, and has local peaks LP near the maximum peak MP, for example.

A frequency band of the frequency spectrum $S_C$ of the portable phone radio signal corresponding to the maximum peak MP is hereinafter referred to as "main lobe", and a frequency band other than the main lobe is hereinafter referred to as "side lobe".

A carrier is spread in the portable phone radio signal over a wide band by spread spectrum modulation, and the frequency spectrum $S_C$ of the portable phone radio signal is broad. Therefore, the side-lobe signal of the portable phone radio signal serves as an interference wave in the in-band IB of the received GPS satellite signal.

When the signal S1 is output from the GPS antenna 10 to the RF receiver circuit section 20, the SAW filter 30 allows a signal component of the signal S1 in a specific band around the in-band IB of the GPS satellite signal to pass through. Specifically, a signal around the in-band IB is mainly extracted by the SAW filter 30, whereby the main-lobe signal of the portable phone radio signal and part of the side-lobe signal are attenuated and removed. The LNA 40 amplifies the signal S2 which has passed through the SAW filter 30, and outputs the amplified signal to the addition section 50.

The frequency spectrum of the generated signal S11 input from the portable phone electronic circuit to the cancellation signal generation section 60 is the same as that of the component of the portable phone radio signal superimposed on the signal S1, and has the same shape as the frequency spectrum $S_C$ in the diagram showing the signal S1. The cancellation signal generation section 60 shifts the input generated signal S11 by 180 degrees using the phase shifter section 601, attenuates the resulting signal using the attenuation section 602, and outputs the attenuated signal to the addition section 50 as the cancellation signal S12.

Since the phase shifter section 601 is designed so that the GPS frequency $f_G$ is the phase shift target frequency, the phase shifter section 601 shifts the signal component of the generated signal S11 in the in-band IB by 180 degrees.

The addition section 50 then adds the cancellation signal S12 generated by the cancellation signal generation section 60 to the signal amplified by the LNA 40, and outputs the resulting signal to the multiplication section 80 as the signal S3. The frequency spectrum of the signal S3 has a shape in which the signal level decreases in the portion of the in-band IB of the GPS satellite signal.

This is because the phase of the cancellation signal S12 is the reverse of that of the signal S2 in the in-band IB, and the cancellation signal S12 is cancelled by the signal S2 due to the addition. Therefore, the interference wave of the portable phone radio signal superimposed on the signal S1 in the in-band has been removed.

The multiplication section 80 then multiplies the signal S3 output from the addition section 50 by the local oscillation signal generated by the local oscillation signal generation section 70 to down-convert the signal S3 to an IF signal, and outputs the IF signal to the amplification section 90.

The amplification section 90 amplifies the signal output from the multiplication section 80, and outputs the amplified signal to the filter 100. The filter 100 allows a signal component of the signal amplified by the amplification section 90 in a band corresponding to the intermediate frequency of the GPS satellite signal (intermediate-frequency band corresponding to the in-band IB) to pass through, and outputs the signal which has passed through the filter 100 to the A/D conversion section 110 as the signal S4.

The signal S4 is a signal obtained by causing the filter 100 to block the out-band signal. Since the signal S4 is an IF signal, the entire frequency spectrum is shifted to the low frequency side, and the vertical axis is provided at a center frequency $IF_G$ of the IF signal (i.e., center frequency of the in-band IB).

1-3. Effect

According to the first embodiment, the LNA 40 amplifies the signal received by the GPS antenna 10, and the addition section 50 adds the amplified signal to the cancellation signal generated by the cancellation signal generation section 60, whereby the in-band noise superimposed on the received signal is canceled.

Since the received signal is added to the cancellation signal after the signal level has been increased due to amplification by the LNA 40, the signal level of the cancellation signal can be easily adjusted as compared with the case of adding the cancellation signal immediately after output from the GPS antenna 10, whereby a situation in which the interference wave component is increased by an excessive cancellation signal can be prevented.

2. Second Embodiment 2-1. Configuration

Figure 4:
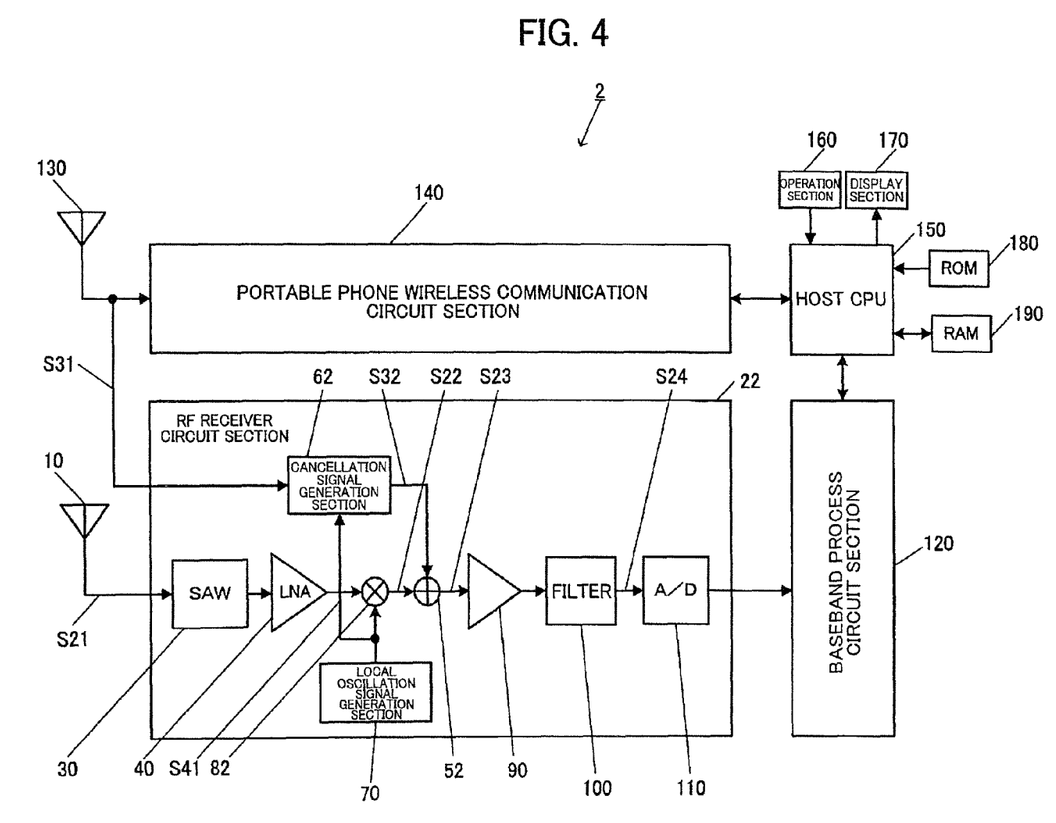
FIG. 4 is a block diagram showing the configuration of a portable phone according to a second embodiment.

FIG. 4 is a block diagram showing the functional configuration of a portable phone 2 according to a second embodiment. The same elements as the elements of the portable phone 1 are indicated by the same symbols. Description of these elements is omitted. The portable phone 2 is configured to include a GPS antenna 10, an RF receiver circuit section 22, a baseband process circuit section 120, a portable phone antenna 130, a portable phone wireless communication circuit section 140, a host CPU 150, an operation section 160, a display section 170, a ROM 180, and a RAM 190.

The RF receiver circuit section 22 is configured to include a SAW filter 30, an LNA 40, a multiplication section 82, an addition section 52, a cancellation signal generation section 62, a local oscillation signal generation section 70, an amplification section 90, a filter 100, and an A/D conversion section 110.

The RF receiver circuit section 22 differs from the RF receiver circuit section 20 of the portable phone 1 in that the received signal is down-converted to an IF signal by the multiplication section 82 and is then added to the cancellation signal generated by the cancellation signal generation section 62 by the addition section 52. Therefore, the cancellation signal generated by the cancellation signal generation section 62 is also an intermediate-frequency signal.

Figure 5:
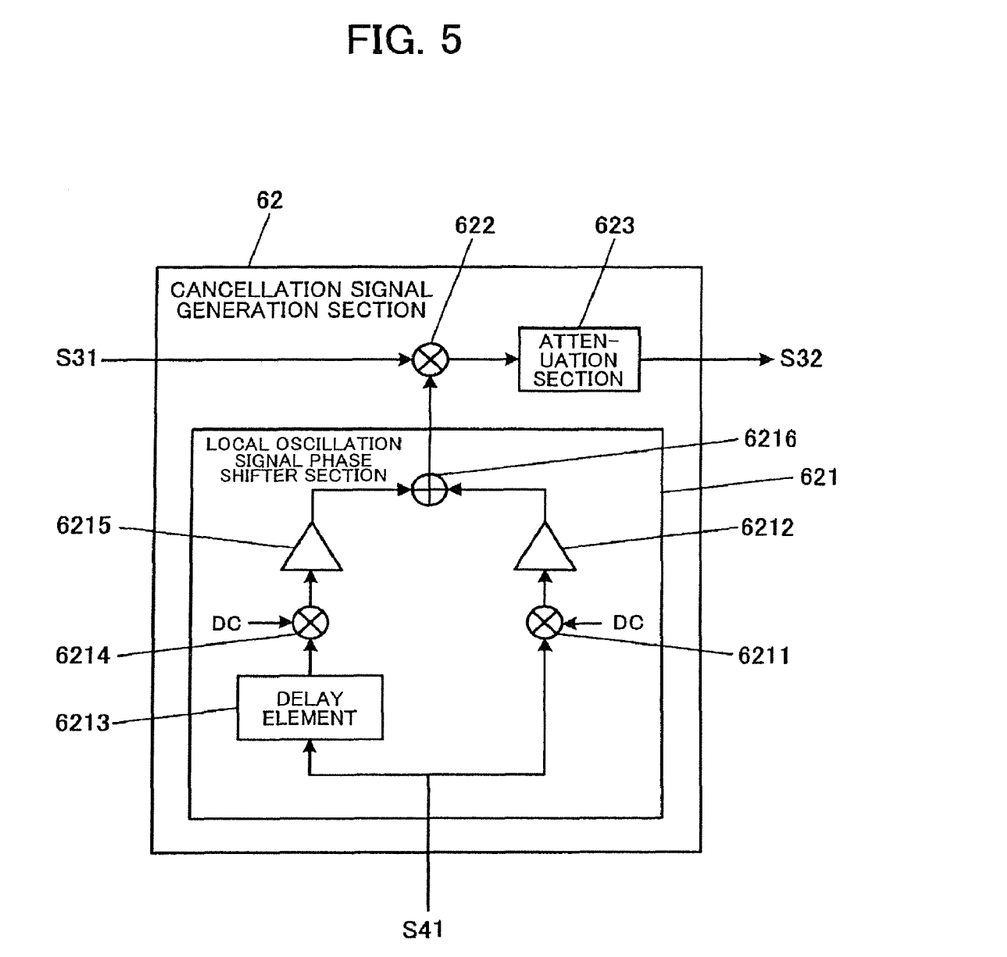
FIG. 5 is a view showing the circuit configuration of a cancellation signal generation section according to the second embodiment.

FIG. 5 is a view showing an example of the circuit configuration of the cancellation signal generation section 62. The cancellation signal generation section 62 is configured to include a local oscillation signal phase shifter section 621, a multiplication section 622, and an attenuation section 623.

The local oscillation signal phase shifter section 621 is a phase shifter circuit which shifts the phase of a local oscillation signal S41 input from the local oscillation signal generation section 70 by 180 degrees. The local oscillation signal phase shifter section 621 is configured to include a direct current signal multiplication section 6211, an in-phase signal amplification section 6212, a delay element 6213, a direct current signal multiplication section 6214, a quadrature signal amplification section 6215, and an addition section 6216. Although the local oscillation signal phase shifter section 621 has a configuration in which a local oscillation signal phase shifter is formed using a quadrature modulator, other configurations may also be employed for the local oscillation signal phase shifter section 621.

The direct current signal multiplication section 6211 is a multiplier which multiplies the local oscillation signal S41 by a direct current (DC) signal generated by dividing a specific voltage, for example. The direct current signal multiplication section 6211 outputs a multiplication result signal to the in-phase signal amplification section 6212 as an in-phase signal (I signal) of the local oscillation signal.

The in-phase signal amplification section 6212 is an amplifier which amplifies the in-phase signal output from the direct-current signal multiplication section 6211 by a specific amplification factor. The in-phase signal amplification section 6212 outputs the amplified signal to the addition section 6216.

The delay element 6213 delays the phase of the local oscillation signal S41 by 90 degrees, and outputs the delayed signal to the direct-current signal multiplication section 6214.

The direct current signal multiplication section 6214 is a multiplier which multiplies the signal output from the delay element 6213 by a direct current signal generated by dividing a specific voltage, for example. The direct current signal multiplication section 6214 outputs a multiplication result signal to the quadrature signal amplification section 6215 as a quadrature signal (Q signal) of the local oscillation signal.

The quadrature signal amplification section 6215 is an amplifier which amplifies the quadrature signal output from the quadrature signal multiplication section 6214 by a specific amplification factor. The quadrature signal amplification section 6215 outputs the amplified signal to the addition section 6216.

The addition section 6216 is an adder which adds the in-phase signal amplified by the in-phase signal amplification section 6212 to the quadrature signal amplified by the quadrature signal amplification section 6215. The addition section 6216 outputs an addition result signal to the multiplication section 622.

The multiplication section 622 is a multiplier which multiplies the signal S31 generated by the portable phone electronic circuit by the local oscillation signal of which the phase has been shifted by the oscillation signal phase shifter section 621. The multiplication section 622 outputs a multiplication result signal to the attenuation section 623.

The signal output from the addition section 6216 is a local oscillation signal of which the phase has been shifted by 180 degrees by setting the gains of the in-phase signal amplification section 6212 and the quadrature signal amplification section 6215 at −1. Therefore, the generated signal S31 becomes an intermediate-frequency signal of which the phase has been shifted by 180 degrees by multiplying the generated signal S31 by the local oscillation signal of which the phase has been shifted by 180 degrees using the multiplication section 622.

The attenuation section 623 is an attenuator which attenuates the generated signal S31 converted to the intermediate-frequency signal by the multiplication section 622 by a specific attenuation factor. The attenuation section 623 outputs the attenuated signal to the addition section 52 as a cancellation signal S32. The attenuation factor of the attenuation section 623 is adjusted to such a value that the amount of noise component in a band corresponding to the intermediate frequency of the GPS satellite signal is minimized in the signal obtained as a result of the addition by the addition section 52.

2-2. Principle and Operation

Figure 6:
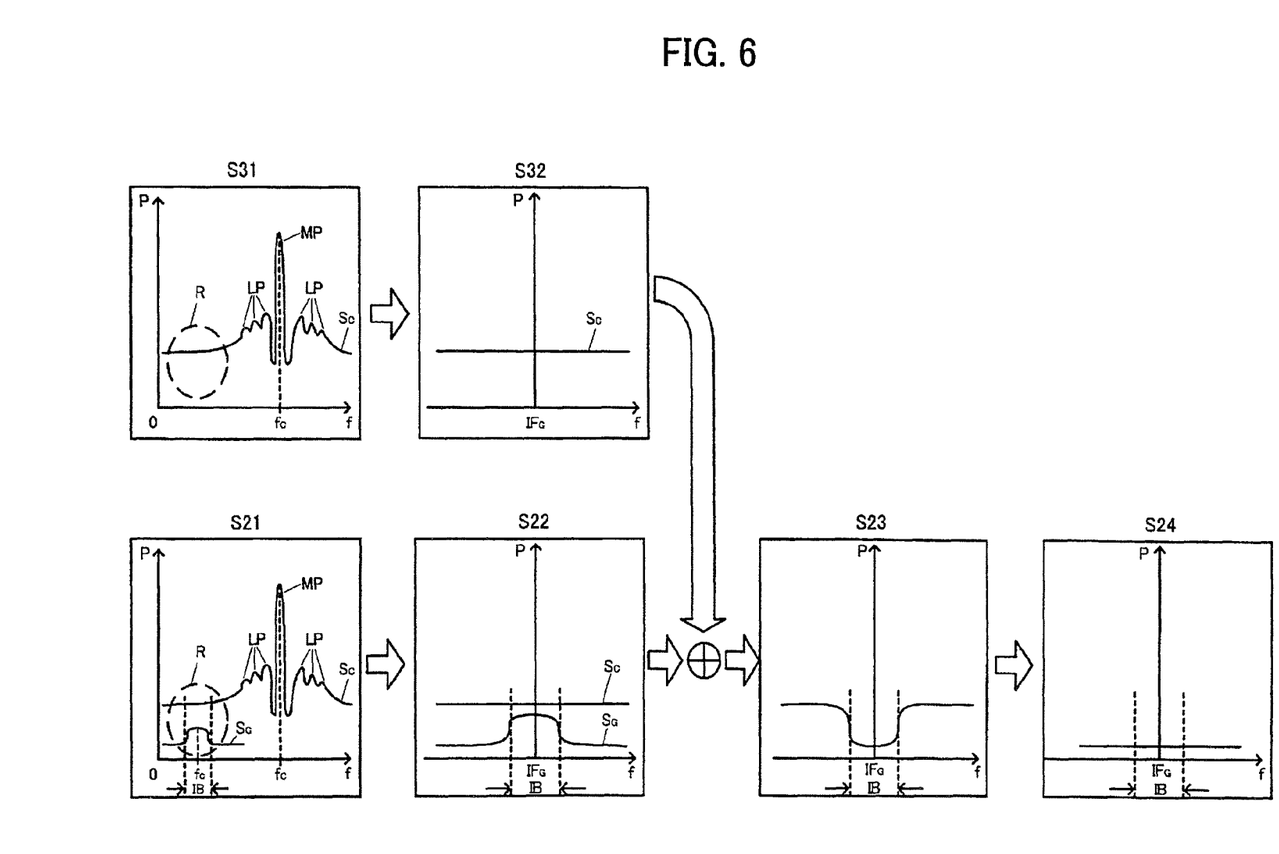
FIG. 6 is a view illustrative of an interference wave removal principle according to the second embodiment.

FIG. 6 is a block diagram showing an interference wave removal principle according to the second embodiment. In FIG. 6, the horizontal axis indicates frequency (f), and the vertical axis indicates signal level (P). FIG. 6 schematically shows the frequency spectra of the signals S21, S22, S23, S24, S31, and S32 shown in FIG. 4. Regarding the frequency spectra of the signals S22, S23, S24, and S32, FIG. 6 gives an enlarged diagram showing a region R around an in-band IB of the GPS satellite signal in order to concisely illustrate the features of this embodiment.

The signal S21 is a signal output from the GPS antenna 10 to the RF receiver circuit section 22. Most of noise superimposed on the signal S21 is the portable phone radio signal. The frequency spectrum of the signal S21 is the same as the frequency spectrum of the signal S1 shown in FIG. 3.

A signal in a specific band around the main-lobe signal of the portable phone radio signal is extracted by causing the signal S21 to pass through the SAW filter 30. The signal which has passed through the SAW filter 30 is amplified by the LNA 40. The multiplication section 82 then multiplies the amplified signal by the local oscillation signal to down-convert the amplified signal. The resulting signal is output to the addition section 52 as the signal S22. Since the signal S22 is an IF signal, the entire frequency spectrum is shifted to the low frequency side, and the vertical axis is provided at a center frequency $IF_G$ of the IF signal (i.e., center frequency of the in-band IB).

The frequency spectrum of the generated signal S31 input to the cancellation signal generation section 62 is the same as that of the component of the portable phone radio signal superimposed on the signal S21, and has the same shape as the frequency spectrum $S_C$ in the diagram showing the signal S21. The generated signal S31 is multiplied by the signal output from the local oscillation signal phase shifter section 621 by the multiplication section 622 of the cancellation signal generation section 62, whereby the generated signal S31 is shifted in phase by 180 degrees and is down-converted to an intermediate-frequency signal.

Since the signal by which the generated signal S31 is multiplied is a signal obtained by shifting the phase of the local oscillation signal by 180 degrees, the phase of the signal obtained by multiplication is also shifted from the phase of the local oscillation signal by 180 degrees. The generated signal S31 converted to the intermediate-frequency signal is attenuated to a cancellation signal S32 by the attenuation section 623, and output to the addition section 52.

The addition section 52 adds the cancellation signal S32 to the signal S22 which is the intermediate-frequency signal of the received signal. In this case, the phase of the signal S22 differs from the phase of the cancellation signal S32 by 180 degrees. This is because the signal by which the generated signal S31 is multiplied is a signal of which the phase differs by 180 degrees from the phase of the local oscillation signal by which the received signal is multiplied. Therefore, the interference wave of the portable phone radio signal superimposed on the signal S21 in the in-band IB is removed.

The signal amplified by the amplification section 90 passes through the filter 100 to become the signal S24. The signal S24 is a signal obtained by causing the filter 100 to block the out-band signal.

2-3. Effect

According to the second embodiment, the multiplication section 82 multiplies the signal received by the GPS antenna 10 by the local oscillation signal to down-convert the signal to an IF signal, and the addition section 52 adds the cancellation signal generated by the cancellation signal generation section 62 to the IF signal, whereby the in-band noise superimposed on the received signal is canceled.

The cancellation signal added by the addition section 52 is generated based on the signal generated by the portable phone electronic circuit and the local oscillation signal generated by the local oscillation signal generation section 70. Specifically, the signal generated by the portable phone electronic circuit is multiplied by the local oscillation signal of which the phase has been shifted by 180 degrees to obtain an intermediate-frequency signal, the intermediate-frequency signal is attenuated by a specific attenuation factor, and the resulting signal is output to the addition section 52 as the cancellation signal.

The signal generated by the portable phone electronic circuit contains signals at various frequencies, and does not have a constant signal level. On the other hand, since the local oscillation signal has a constant frequency and a constant signal level, it is easy to shift the phase of the local oscillation signal. Therefore, the phase of the signal generated by the portable phone electronic circuit can be simply shifted by employing a configuration in which the signal generated by the portable phone electronic circuit is multiplied by the local oscillation signal of which the phase has been shifted.

3. Third Embodiment

3-1. Configuration

Figure 7:
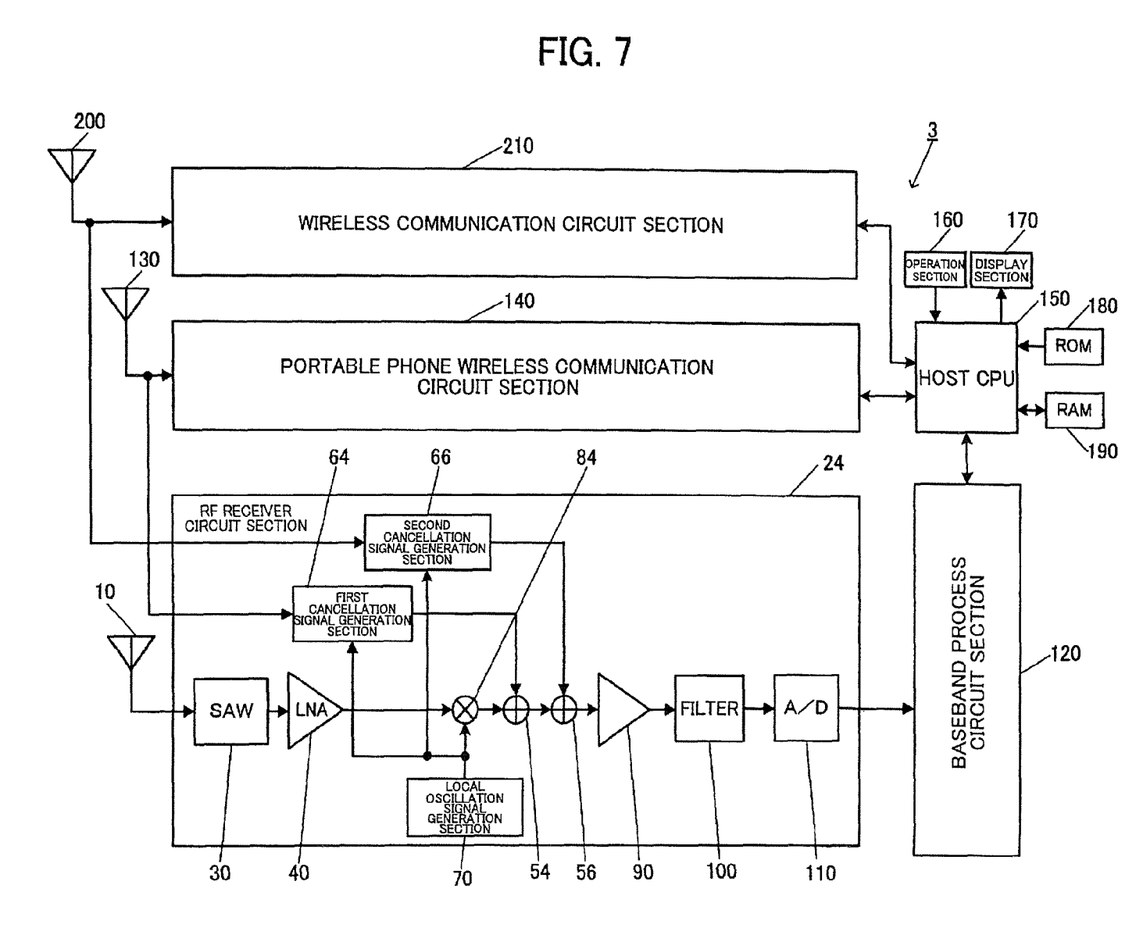
FIG. 7 is a block diagram showing the configuration of a portable phone according to a third embodiment.

FIG. 7 is a block diagram showing the functional configuration of a portable phone 3 according to a third embodiment. The same elements as the elements of the portable phone 1 are indicated by the same symbols. Description of these elements is omitted. The portable phone 3 is configured to include a GPS antenna 10, an RF receiver circuit section 24, a baseband process circuit section 120, a portable phone antenna 130, a portable phone wireless communication circuit section 140, a host CPU 150, an operation section 160, a display section 170, a ROM 180, a RAM 190, a radio antenna 200, and a wireless communication circuit section 210.

The RF receiver circuit section 24 is configured to include a SAW filter 30, an LNA 40, a multiplication section 84, a first addition section 54, a second addition section 56, a first cancellation signal generation section 64, a second cancellation signal generation section 66, a local oscillation signal generation section 70, an amplification section 90, a filter 100, and an A/D conversion section 110.

The wireless communication circuit section 210 is a circuit section which performs wireless communication conforming to a communication standard (e.g., wireless LAN conforming to Bluetooth (registered trademark) or IEEE802.11) with another device through the radio antenna 200.

Since the portable phone 3 includes a portable phone electronic circuit including the portable phone antenna 130 and the portable phone wireless communication circuit section 140 and a wireless communication electronic circuit including the radio antenna 200 and the wireless communication circuit section 210, these two electronic circuits are positioned near the GPS reception section, whereby an interference wave for a GPS satellite signal (received signal) received by the GPS reception section is generated from two sources.

Therefore, the first cancellation signal generation section 64 which generates a cancellation signal which cancels the signal generated by the portable phone electronic circuit and the second cancellation signal generation section 66 which generates a cancellation signal which cancels the signal generated by the wireless communication electronic circuit are provided, and the generated cancellation signals are respectively added to the down-converted intermediate-frequency signal by the first addition section 54 and the second addition section 56, whereby the in-band interference wave from each electronic circuit superimposed on the received signal can be canceled. The circuit configurations of the first cancellation signal generation section 64 and the second cancellation signal generation section 66 are the same as the circuit configuration of the cancellation signal generation section 62 of the portable phone 2.

3-2. Effect

According to the third embodiment, the cancellation signal which cancels the signal generated by the portable phone electronic circuit and the cancellation signal which cancels the signal generated by the wireless communication electronic circuit are respectively generated by the first cancellation signal generation section 64 and the second cancellation signal generation section 66, and added to the received signal by the first addition section 54 and the second addition section 56, whereby the in-band noise superimposed on the received signal is canceled. Therefore, even if two or more noise sources exist in the housing, noise superimposed on the received signal can be appropriately cancelled.

4. Modification

4-1. Application Example

The invention may be applied to various electronic instruments such as a portable navigation device, a car navigation system, and a personal computer (PC) in addition to the portable phone. Specifically, the invention may be applied to an electronic instrument including a receiver circuit which receives a radio signal and an electronic circuit which generates a signal serving as an interference wave (noise) for the received signal.

The receiver circuit may be a communication circuit other than the GPS signal receiver circuit. The electronic circuit which generates an interference wave for the signal received by the receiver circuit may be a computer system, various communication circuits, and the like.

4-2. Satellite Positioning System

The above embodiments have been described taking the GPS as an example of the satellite positioning system. Note that the invention may also be applied to other satellite positioning systems such as WAAS, QZSS, GLONASS, and GALILEO.

4-3. Attenuation Section

The cancellation signal generation section may adjust the attenuation factor of the attenuation section based on the signal obtained as a result of the addition by the addition section. This is because an electronic circuit provided near the reception section does not necessarily always perform a constant circuit operation and may appropriately change the circuit operation depending on the operation/suspension and the like.

Figure 8:
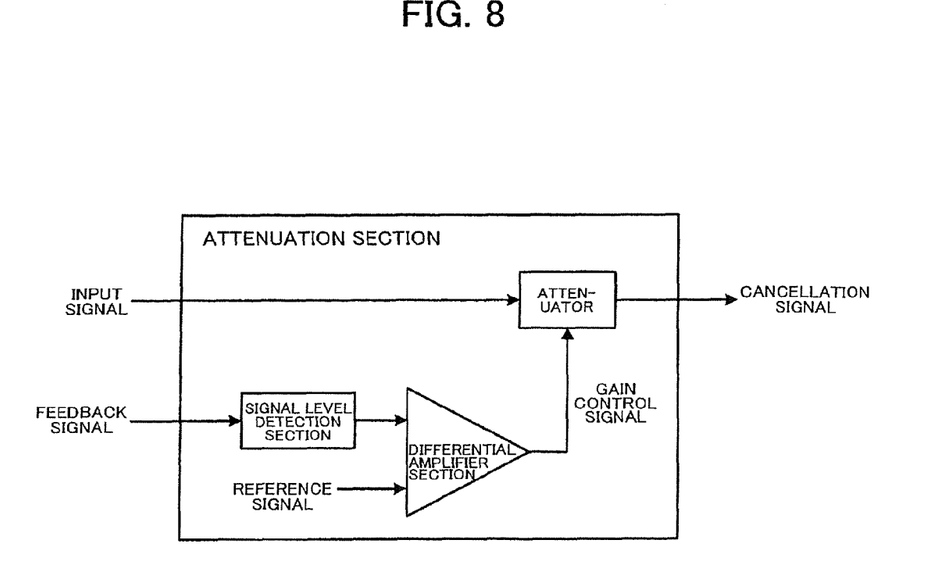
FIG. 8 is a view showing the circuit configuration of an attenuation section according to a modification.

Specifically, the output signal from the filter 100 is input to the attenuation section so that the signal after noise cancellation which has passed through the filter 100 is fed back to the attenuation section. The attenuation section adjusts the attenuation factor based on the feedback signal.

FIG. 8 is a view showing an example of the circuit configuration of the attenuation section employed in this case. The attenuation section is configured to include an attenuator, a signal level detection section, and a differential amplifier section.

The attenuator is a variable attenuator which attenuates the input signal by an attenuation factor corresponding to an attenuation factor control signal (hereinafter referred to as "gain control signal") output from the differential amplifier section, and outputs the attenuated signal to the addition section as a cancellation signal.

The signal level detection section is a circuit section including a known signal level detection circuit. The signal level detection section detects the signal level of the feedback signal, and outputs the detected signal level to the differential amplifier section.

The differential amplifier section is a known differential amplifier circuit including an operational amplifier and the like. The differential amplifier section compares the signal level of the signal detected by the signal level detection section with the signal level of a reference signal, and outputs a signal corresponding to the difference to the attenuator as the gain control signal. The reference signal is generated by dividing a specific voltage, for example.

According to this configuration, the attenuation factor can be adjusted by feeding back the noise cancellation result. Therefore, even if the signal level of the signal generated by the electronic circuit has changed, a cancellation signal with an appropriate signal level can be appropriately generated. The circuit configuration of this attenuation section may be applied to the cancellation signal generation section according to the above embodiments.

4-4. RF Receiver Circuit Section

The configuration of the RF receiver circuit section 24 of the portable phone 3 according to the third embodiment may be replaced by the configuration of the RF receiver circuit section 20 of the portable phone 1 according to the first embodiment. Specifically, the cancellation signal generation sections 60 respectively corresponding to a portable phone communication circuit and a wireless communication circuit are provided. After the LNA 40 has amplified the received signal, the addition section 50 adds the cancellation signal generated by each cancellation signal generation section 60 to the received signal, and the multiplication section 80 downconverts the addition result signal.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A receiver circuit comprising:
   a local oscillation section that generates a local oscillation signal;
   an intermediate frequency conversion section that converts a received signal received by a reception section into an intermediate-frequency signal using the local oscillation signal;
   a cancellation signal generation section that generates a cancellation signal by multiplying an undesired signal generated near the reception section by a 180 degrees phase-shifted local oscillation signal; and
   an addition section that adds the cancellation signal to the intermediate-frequency signal.

2. The receiver circuit as defined in claim 1, further comprising:
   a filter section that allows a component of the signal output from the intermediate frequency conversion section to pass through, the component being in a band corresponding to the intermediate frequency of the radio signal,
   the addition section adding the cancellation signal to the intermediate-frequency signal in a preceding stage of the filter section.

3. The receiver circuit as defined in claim 1,
   the intermediate frequency conversion section multiplying the received signal by the local oscillation signal to convert the received signal into the intermediate-frequency signal;
   the cancellation signal generation section including a phase shifter section that shifts a phase of the local oscillation signal by 180 degrees, the cancellation signal canceling the undesired signal generated by an electronic circuit disposed near the reception section, the cancellation signal generation section generating the cancellation signal by multiplying the undesired signal by the signal that has been phase-shifted by the phase shifter section.

4. A signal processing method comprising:
   generating a local oscillation signal;
   shifting a phase of the local oscillation signal by 180 degrees;
   generating a cancellation signal by multiplying an undesired signal generated near a reception section by a 180 degrees phase-shifted local oscillation signal;
   converting a received signal received by a reception section into an intermediate-frequency signal using the local oscillation signal; and
   adding the cancellation signal to the intermediate-frequency signal.

5. The signal processing method as defined in claim 4, further comprising:
   extracting a signal in a band corresponding to an intermediate frequency of the radio signal from the intermediate-frequency signal, and outputting the extracted signal to a circuit in a subsequent stage,
   the adding of the cancellation signal including adding the cancellation signal to the intermediate-frequency signal before the extraction.

6. The signal processing method as defined in claim 4, further comprising:
   the converting of the received signal including converting the received signal into the intermediate-frequency signal by multiplying the received signal by the local oscillation signal; and
   the generating of the cancellation signal including generating the cancellation signal by multiplying the undesired signal generated by an electronic circuit by the signal that has been phase-shifted, the electronic circuit disposed near the reception section.

* * * * *